US012552996B2

(12) United States Patent
Horenz et al.

(10) Patent No.: US 12,552,996 B2
(45) Date of Patent: *Feb. 17, 2026

(54) METHOD AND SYSTEM FOR STEAMCRACKING

(71) Applicant: LINDE GMBH, Pullach (DE)

(72) Inventors: Michael Horenz, Munich (DE); Mathieu Zellhuber, Martinsried (DE); Robert Stegemann, Munich (DE); Gunther Schmidt, Deisenhofen (DE)

(73) Assignee: Linde GmbH, Pullach (DE)

( * ) Notice: Subject to any disclaimer, the term of this patent is extended or adjusted under 35 U.S.C. 154(b) by 204 days.

This patent is subject to a terminal disclaimer.

(21) Appl. No.: 18/548,881

(22) PCT Filed: Mar. 8, 2022

(86) PCT No.: PCT/EP2022/055877
§ 371 (c)(1),
(2) Date: Sep. 1, 2023

(87) PCT Pub. No.: WO2022/189423
PCT Pub. Date: Sep. 15, 2022

(65) Prior Publication Data
US 2024/0158701 A1 May 16, 2024

(30) Foreign Application Priority Data

Mar. 10, 2021 (EP) ..................... 21161768

(51) Int. Cl.
*C10G 9/36* (2006.01)
*F22D 1/00* (2006.01)

(52) U.S. Cl.
CPC ............ *C10G 9/36* (2013.01); *F22D 1/003* (2013.01); *C10G 2400/20* (2013.01); *C10G 2400/22* (2013.01)

(58) Field of Classification Search
None
See application file for complete search history.

(56) References Cited

U.S. PATENT DOCUMENTS

| | | |
|---|---|---|
| 3,426,733 A | 2/1969 | Von Wiesenthal |
| 4,107,226 A | 8/1978 | Ennis, Jr. et al. |

(Continued)

FOREIGN PATENT DOCUMENTS

| | | |
|---|---|---|
| CN | 109844068 A | 6/2019 |
| CN | 111944556 A | 11/2020 |

(Continued)

OTHER PUBLICATIONS

International Search Report and Written Opinion issued in related App. No. PCT/EP2022/055877, mailed Jun. 10, 2022.

(Continued)

*Primary Examiner* — Tam M Nguyen
(74) *Attorney, Agent, or Firm* — Avek IP, LLC

(57) ABSTRACT

A method of steam cracking includes using a steam cracking arrangement that has a fired cracking furnace, a quench cooling train, and rotating equipment at least partly driven by electric energy. A process gas stream is passed through the furnace and the cooling train. A steam generation arrangement, operated in thermal association with the cracking arrangement, results in superheated high pressure steam at a first pressure level of 30 and 175 bar absolute pressure and at a first temperature level. No steam at a higher temperature level than the first is generated. The superheated high pressure steam is partially adiabatically and isenthalpically expanded to a second lower pressure level. The first temperature level is selected such that each intermediate temperature level reached at intermediate pressure levels of (Continued)

more than 20 bar during the adiabatic and isenthalpic expansion process is between 5 and 120 K above the dew point of steam.

19 Claims, 9 Drawing Sheets

(56) References Cited

U.S. PATENT DOCUMENTS

| | | | |
|---|---|---|---|
| 4,321,130 | A | 3/1982 | Bacsik |
| 4,617,109 | A | 10/1986 | Wells et al. |
| 4,912,282 | A | 3/1990 | Klaus |
| 9,989,305 | B2 | 6/2018 | Mak |
| 2003/0175642 | A1 | 9/2003 | Stephens et al. |
| 2006/0116543 | A1 | 6/2006 | Bellet et al. |
| 2014/0212823 | A1 | 7/2014 | Novak et al. |
| 2016/0097002 | A1 | 4/2016 | Sundaram |
| 2017/0022429 | A1 | 1/2017 | Van Willigenburg |
| 2020/0172814 | A1 | 6/2020 | Oud |
| 2020/0290939 | A1 | 9/2020 | Willigenburg |
| 2021/0171836 | A1 | 6/2021 | Purola |
| 2022/0395805 | A1* | 12/2022 | Mortensen ............... B01J 19/32 |
| 2023/0407186 | A1* | 12/2023 | Sundaram ................ C10G 9/24 |
| 2024/0158700 | A1* | 5/2024 | Zellhuber ................ F22B 1/18 |
| 2024/0158701 | A1 | 5/2024 | Horenz et al. |
| 2024/0158702 | A1* | 5/2024 | Zellhuber ........... C10G 51/023 |
| 2024/0239728 | A1 | 7/2024 | Keller et al. |
| 2025/0026986 | A1 | 1/2025 | Zellhuber et al. |

FOREIGN PATENT DOCUMENTS

| | | |
|---|---|---|
| CN | 112368235 A | 2/2021 |
| DE | 710185 C | 9/1941 |
| DE | 1615278 A1 | 7/1970 |
| DE | 2362628 A1 | 6/1975 |
| DE | 3334334 A1 | 4/1985 |
| DE | 4128180 A1 | 2/1993 |
| DE | 102004020223 A1 | 11/2005 |
| EP | 0229939 A1 | 7/1987 |
| EP | 0229939 B1 | 11/1988 |
| EP | 3075704 A1 | 10/2016 |
| EP | 3249027 A1 | 11/2017 |
| EP | 3249028 A1 | 11/2017 |
| EP | 3415587 A1 | 12/2018 |
| EP | 3730592 A1 | 10/2020 |
| EP | 3748138 A1 | 12/2020 |
| WO | 2005113713 A2 | 12/2005 |
| WO | 2013178446 A1 | 12/2013 |
| WO | 2014090914 A1 | 6/2014 |
| WO | 2015197181 A1 | 12/2015 |
| WO | 2018020399 A1 | 2/2018 |
| WO | 2018065919 A1 | 4/2018 |
| WO | 2018229267 A1 | 12/2018 |
| WO | 2020035575 A1 | 2/2020 |
| WO | 2020150244 A1 | 7/2020 |
| WO | 2020150248 A1 | 7/2020 |
| WO | 2020150249 A1 | 7/2020 |
| WO | 2021052642 A1 | 3/2021 |
| WO | 2022189423 A1 | 9/2022 |

OTHER PUBLICATIONS

Sinatra et al., "Polimeri Europa Olefin Plant Maximizes Benefits from Advanced Solutions," 2003 AIChE Spring National Meeting, Apr. 2, 2003, pp. 1-29.

Office Action and Search Report issued Oct. 21, 2025 in Chinese Application No. 202280034298.0, 6 pages.

* cited by examiner

METHOD AND SYSTEM FOR STEAMCRACKING

CROSS-REFERENCE TO RELATED APPLICATIONS

This application is the national phase of, and claims priority to, International Application No. PCT/EP2022/055877, filed Mar. 8, 2022, which claims priority to European Application No. EP 21161768.3 filed Mar. 10, 2021.

FIELD OF THE INVENTION

The invention relates to a method and a system for steam cracking.

BACKGROUND

The invention is based on the steam cracking technology for the production of olefins and other base chemicals, as e.g. described in the article "Ethylene" in Ullmann's Encyclopedia of Industrial Chemistry, online publication 15 Apr. 2009, DOI: 10.1002/14356007.a10_045.pub2.

According to U.S. Pat. No. 4,617,109 A, combustion air for steam cracking furnaces is preheated by indirect heat exchange with medium pressure and low pressure steam that has been expanded through steam turbines from high pressure steam produced in the hot section of an ethylene production plant.

A method for quenching cracked gases and recovery of heat therefrom by cooling the gases in heat exchange with steam to increase superheat level of the steam and subsequently recovering heat from the superheated steam is disclosed in U.S. Pat. No. 4,107,226 A.

Presently, the thermal energy required for initiating and maintaining the endothermic cracking reactions in steam cracking is provided by the combustion of fuel gas in a refractory furnace. The process gas initially containing steam and the hydrocarbons to be cracked is passed through so-called cracking coils placed inside the refractory box, also called radiant zone or section. On this flow path the process gas is continuously heated, enabling the desired cracking reactions to take place inside the cracking coils, and thus the process gas is continuously enriched in the cracking products. Typical inlet temperatures for the process gas into the cracking coils are between 550 and 750° C., outlet temperatures are typically in the range between 800 and 900° C.

In addition to the radiant zone, fired cracking furnaces comprise a so-called convection zone or section and a so-called quench zone or section. The convection zone is usually positioned above the radiant zone and composed of various tube bundles traversing the flue gas duct from the radiant zone. Its main function is to recover as much energy as possible from the hot flue gas leaving the radiant zone. Indeed, only 35 to 50% of the total firing duty is typically transferred within the radiant zone to the process gas passed through the cracking coils. The convection zone therefore plays a central role in the energy management in steam cracking, as it is responsible for the beneficial usage of approximately 40 to 60% of the heat input into a furnace (i.e. of the firing duty). Indeed, when taking the radiant and convection zone together, modern steam cracking plants make use of 90 to 95% of the overall fired duty (based on the fuel's lower heating value or net calorific value). In the convection section, the flue gas is cooled down to temperature levels between 60 and 140° C. before leaving the convection section and being released to the atmosphere via stack.

The flue gas heat recovered in the convection zone is typically used for process duties such as preheating of boiler feed water and/or hydrocarbon feeds, (partial) vaporization of liquid hydrocarbon feeds (with or without prior process steam injection), and superheating of process steam and high-pressure steam.

The quench zone is positioned downstream of the radiant zone along the main process gas route. It is composed of one or more heat exchanger units, having the main functions of quickly cooling the process gas below a maximum temperature level to stop the cracking reactions, to further cool down the process gas for downstream treatment, and to effectively recover sensible heat from the process gas for further energetic usage. In addition, further cooling or quenching can be effected via injection of liquids, e.g. by oil quench cooling when steam cracking liquid feeds.

The process gas heat recovered in the quench section is typically used for vaporizing high-pressure (HP) or super-high-pressure (SHP) boiler feed water (typical at a pressure range between 30 and 130 bar absolute pressure), and for preheating the same boiler feed water, before it being fed to a steam drum. Saturated high-pressure or super-high-pressure steam generated accordingly may be superheated in the convection zone (see above) to form superheated high-pressure or super-high-pressure steam, and from there may be distributed to the central steam system of the plant, providing heat and power for heat exchangers and steam turbines or other rotating equipment. The typical degree of steam superheating achieved in furnace convection zones lies between 150 and 250 K above the saturation temperature (dew point margin). Generally, steam cracking furnaces may operate with high-pressure steam (typically at 30 to 60 bar) or with super-high-pressure-steam (typically at 60 to 130 bar). For the sake of clarity in the description of the invention, high-pressure-steam will be used for the entire pressure range between 30 and 130 bar, but also beyond this upper limit, since the invention includes usage of steam at pressures of up to 175 bar.

An important part of the process gas treatment subsequent to quench cooling is compression which is typically performed after further treatment such as the removal of heavy hydrocarbons and process water, in order to condition the process gas for separation. This compression, also called process or cracked gas compression, is typically performed with multistage compressors driven by steam turbines. In the steam turbines, steam at a suitable pressure from the central steam system of the plant mentioned, and thus comprising steam produced using heat from the convection section and from quench cooling, can be used. Typically, in a steam cracking plant of the prior art, heat of the flue gas (in the convection zone) and heat of the process gas (in the quench zone) is well balanced with the heat demand for producing a large part of the steam amounts needed for heating and driving steam turbines. In other words, waste heat may be more or less fully utilized for generating steam which is needed in the plant. Additional heat for steam generation may be provided in a (fired) steam boiler.

For reference, and to further illustrate the background of the invention, a conventional fired steam cracking arrangement is illustrated in FIG. 1 in a highly simplified, schematic partial representation and is designated 900.

The steam cracking arrangement 900 illustrated in FIG. 1 comprises, as illustrated with a reinforced line, one or more cracking furnaces 90. For conciseness only, "one" cracking furnace 90 is referred to in the following, while typical steam cracking arrangements 900 may comprise a plurality of cracking furnaces 90 which can be operated under the same or different conditions. Furthermore, cracking furnaces 90 may comprise one or more of the components explained below.

The cracking furnace 90 comprises a radiant zone 91 and a convection zone 92. In other embodiments than the one shown in FIG. 1, also several radiant zones 91 may be associated with a single convection zone 92, etc.

In the example illustrated, several heat exchangers 921 to 925 are arranged in the convection zone 92, either in the arrangement or sequence shown or in a different arrangement or sequence. These heat exchangers 921 to 925 are typically provided in the form of tube bundles passing through the convection zone 92 and are positioned in the flue gas stream from the radiant zone 91.

In the example illustrated, the radiant zone 91 is heated by means of a plurality of burners 911 arranged on the floor and wall sides of a refractory forming the radiant zone 91, which are only partially designated. In other embodiments, the burners 911 may also be provided solely at the wall sides or solely at the floor side. The latter may preferentially be the case e.g. when pure hydrogen is used for firing.

In the example illustrated, a gaseous or liquid feed stream 901 containing hydrocarbons is provided to the steam cracking arrangement 900. It is also possible to use several feed streams 901 in the manner shown or in a different manner. The feed stream 901 is preheated in the heat exchanger 921 in the convection zone 92.

In addition, a boiler feed water stream 902 is passed through the convection zone 92 or, more precisely, the heat exchanger 922, where it is preheated. The boiler feed water stream 902 is thereafter introduced into a steam drum 93. In the heat exchanger 923 in the convection zone 92, a process steam stream 903, which is typically provided from a process steam generation system located outside the furnace system of the steam cracking arrangement 900, is further heated and, in the example illustrated in FIG. 1, thereafter combined with the feed stream 901.

A stream 904 of feed and steam formed accordingly is passed through a further heat exchanger 925 in the convection zone 92 and is thereafter passed through the radiant zone 91 in typically several cracking coils 912 to form a cracked gas stream 905. The illustration in FIG. 1 is highly simplified. Typically, a corresponding stream 904 is evenly distributed over a number of cracking coils 912 and a cracked gas formed therein is collected to form the cracked gas stream 905.

As further illustrated in FIG. 1, a steam stream 906 can be withdrawn from the steam drum 93 and can be (over)heated in a further heat exchanger 924 in the convection zone 92, generating a high-pressure steam stream 907. The high-pressure steam stream 907 can be used in the steam cracking arrangement 900 at any suitable location and for any suitable purpose as not specifically illustrated.

The cracked gas stream 905 from the radiant zone 12 or the cracking coils 912 is passed via one or more transfer lines to a quench exchanger 94 where it is rapidly cooled for the reasons mentioned. The quench exchanger 94 illustrated here represents a primary quench (heat) exchanger. In addition to such a primary quench exchanger 94, further quench exchangers may also be present.

The cooled cracked gas stream 907 is passed to further process units 95 which are shown here only very schematically. These further process units 95 can, in particular, be process units for scrubbing, compression and fractionation of the cracked gas, and a compressor arrangement including a steam turbine, which may be operated using steam from the steam drum 93, being indicated with 96.

In the example shown, the quench exchanger 94 is operated with a water stream 908 from the steam drum 93. A steam stream 909 formed in the quench exchanger 94 is returned to the steam drum 93.

SUMMARY

Ongoing efforts to reduce at least local carbon dioxide emissions of industrial processes also extend to the operation of steam cracking plants. As in all fields of technology, a reduction of local carbon dioxide emissions may particularly be effected by electrification of a part of or all possible process units.

As described in EP 3 075 704 A1 in connection with a reformer furnace, a voltage source may be used in addition to a burner, the voltage source being connected to the reactor tubes in such a manner that an electric current generated thereby heats the feedstock. Steam cracking plants in which electrically heated steam cracking furnaces are used were proposed for example in WO 2020/150244 A1, WO 2020/150248 A1 and WO 2020/150249 A1. Electric furnace technology in other or broader contexts is for example disclosed in WO 2020/035575 A1, WO 2015/197181 A1, EP 3 249 028 A1, EP 3 249 027 A1 and WO 2014/090914 A1, or in older documents such as for example DE 23 62 628 A1, DE 1 615 278 A1, DE 710 185 C and DE 33 34 334 A1.

Completely or partly modifying the heating concept of a steam cracking plant, i.e. using heat generated by electric energy completely or partly instead of heat generated by burning a fuel, is a rather substantial intervention. As an alternative, less invasive redesign options are often desired, particularly when retrofitting existing plants. These may for example include substituting a steam turbine used for driving the process gas compressor or a different compressor at least partly by an electric drive. While, as mentioned, such a steam turbine may be partly operated with steam generated by waste heat recovered in the convection section of the cracking furnaces, fired steam boilers must typically be provided additionally to supply sufficient steam quantities. Therefore, substituting a steam turbine used for driving the compressors mentioned at least partly by an electric drive may be suitable to reduce or avoid fired boiler duty and thereby to reduce local carbon dioxide emissions.

As further explained below, however, particularly an electrification of parts of such plants has a significant influence on the heat balance of the overall plant. That is, if steam turbines for driving compressors are substituted by electric drives, the waste heat generated in the plant, which was previously used for driving the steam turbines, cannot be fully utilized anymore. On the other hand, if fired furnaces are substituted by electric furnaces, no waste heat from flue gases, which was previously used for providing steam, heating feeds, etc. is not available anymore.

In other words, substituting any carbon dioxide emitting parts of a steam cracking parts has a massive influence on the overall plant operation and is not simply a matter of exchanging one component against another. An efficient and effective integration of such components into a steam cracking plant is therefore of paramount importance for the overall plant design, in particular regarding energy management.

The invention relates, in this connection, particularly to a situation wherein fired steam cracking furnaces are used but wherein pumps, compressors or other rotating equipment is at least partly driven by electric motors instead of using steam turbines, and therefore at least a "partial electrification" of a steam cracking plant is realized. Also in such situations, as mentioned, an adapted mode of operation must be found as the conventionally well-balanced steam production and consumption situation gets imbalanced by reducing steam consumers.

According to one embodiment of the invention, a method of steam cracking includes providing a steam cracking arrangement. The steam cracking arrangement includes one or more fired cracking furnaces; one or more quench cooling trains; and one or more compressors and/or pumps as rotating equipment. The rotating equipment is at least partly driven by electric energy. The method further includes passing one or more process gas streams at least through the one or more fired cracking furnaces and the one or more quench cooling trains. One or more steam generation arrangements is or are operated in thermal association with the one or more steam cracking arrangements. Operating the one or more steam generation arrangements results in at least superheated high pressure steam at a first pressure level between 30 and 175 bar absolute pressure and at a first temperature level. No steam at a higher temperature level than the first temperature level is generated in the one or more steam generation arrangements. The superheated high pressure steam at the first pressure level is at least in part adiabatically and isenthalpically expanded to a second pressure level below the first pressure level such that its temperature level is lowered to a second temperature level. The first temperature level is selected such that each intermediate temperature level reached at intermediate pressure levels of more than 20 bar during the adiabatic and isenthalpic expansion is between 5 and 120 K above the dew point of steam at the respective intermediate pressure level during the adiabatic and isenthalpic expansion.

According to another embodiment of the invention, a system for performing a method of steam cracking includes one or more steam cracking arrangements and one or more steam generation arrangements. Each steam cracking arrangement includes one or more fired cracking furnaces; one or more quench cooling trains; and one or more compressors and/or pumps as rotating equipment. The one or more steam generation arrangements is/are operable in thermal association with the one or more steam crack arrangements. The system is configured to pass one or more process gas streams at least through the one or more fired cracking furnaces and the one or more quench cooling trains of the one or more steam cracking arrangements. The system is further configured to drive the rotating equipment at least partly by electric energy. The one or more steam generation arrangements is or are configured to generate at least superheated high pressure steam at a first pressure level of 30 and 175 bar absolute pressure and at a first temperature level and no steam at a higher temperature level than the first temperature level. Means are provided which are configured to expand the superheated high pressure steam at the first pressure level at least in part adiabatically and isenthalpically to a second pressure level below the first pressure level of at least 20 bar absolute pressure such that its temperature level is lowered to a second temperature level. The system is also configured to select the first temperature level such that each intermediate temperature level reached at intermediate pressure levels of more than 20 bar during the adiabatic and isenthalpic expansion process is between 5 and 120 K above the dew point of steam at the respective intermediate pressure level during the adiabatic and isenthalpic expansion.

DETAILED DESCRIPTION

Figure 1:
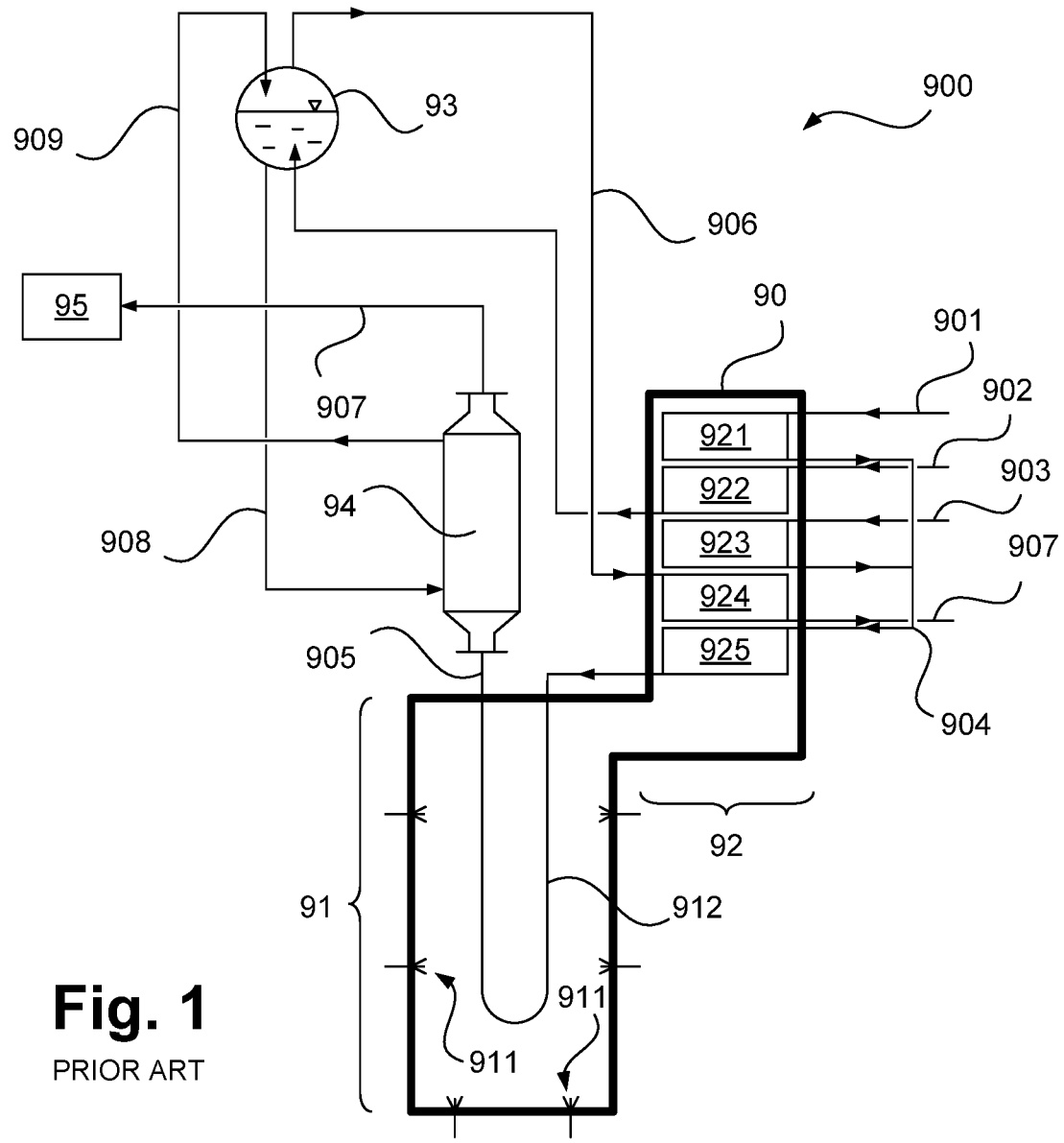
FIG. 1 illustrates a prior art embodiment not forming part of the invention.

Before further describing the features and advantages of the invention, some terms used in the description thereof will be further explained.

The term "process steam" shall refer to steam that is added to a hydrocarbon feed before the hydrocarbon feed is subjected to steam cracking. In other terminology, the process steam is a part of a corresponding feed. Process steam therefore takes part in the steam cracking reactions as generally known. Process steam may particularly include steam generated from the vaporization of "process water", i.e. water which was previously separated from a mixed hydrocarbon/water stream, e.g. from the process gas withdrawn from steam cracking furnaces or from a fraction thereof, particularly by gravity separation in vessels/coalescers, deoxygenation units, or using filters.

The "process gas" is the gas mixture passed through a steam cracking furnace and thereafter subjected to processing steps such as quenching, compression, cooling and separation. The process gas, when supplied to the steam cracking furnace, comprises steam and the educt hydrocarbons subjected to steam cracking, i.e. also the "feed stream" submitted to steam cracking is, herein, also referred to as process gas. If a differentiation is needed, this is indicated by language such as "process gas introduced into a steam cracking furnace" and "process gas effluent" or similar. When leaving the steam cracking furnace, the process gas is enriched in the cracking products and is particularly depleted in the educt hydrocarbons. During the subsequent processing steps, the composition of the process gas may further change, e.g. due to fractions being separated therefrom.

The term "high-purity steam" shall, in contrast to process steam, refer to steam generated from the vaporization of purified boiler feed water. High purity steam is typically specified by standards customary in the field, such as VGB-S-010-T-00 or similar. It typically does not include steam generated from process water, as the latter typically contains some further components from the process gas.

The term "feed hydrocarbons" shall refer to at least one hydrocarbon which is subjected to steam cracking in a steam cracking furnace in a process gas. Where the term "gas feed" is used, the feed hydrocarbons predominantly or exclusively comprise hydrocarbons with two to four carbon atoms per molecule. In contrast, the term "liquid feed" shall refer to feed hydrocarbons which predominantly or exclusively comprise hydrocarbons with four to 40 carbon atoms per molecule, "heavy feed" being at the upper end of this range.

The term "electric furnace" may generally be used for a steam cracking furnace in which the heat required to heat the process gas in the cracking coils is predominantly or exclusively provided by electricity. Such a furnace may include one or more electric heater devices that are connected to an electric power supply system, either via wired connections and/or via inductive power transmission. Inside the heater device material, the applied electric current is generating a volumetric heat source by Joule heating. If the cracking coil itself is used as electric heating device, the released heat is directly transferred to the process gas by convective-conductive heat transfer. If separate electric heating devices are used, the heat released by Joule heating is indirectly transferred from the heating device to the process gas, first from the heating device to the cracking coils preferably via radiation and, to a minor extent, via convection, and then from the cracking coils to the process gas by convective-conductive heat transfer. The process gas may be preheated in various ways before being supplied to the cracking furnace.

A "fired furnace" is, in contrast, generally a steam cracking furnace in which the heat required to heat the process gas in the cracking coils is predominantly or exclusively provided by firing a fuel using one or more burners. The process gas may be preheated in various ways before being supplied to the cracking furnace.

The term "hybrid heating concept" may generally be used when, in steam cracking, a combination of electric furnaces and fired furnaces is used. In the context of the invention, it is preferably foreseen that a single cracking coil is strictly attributed to a fired or to an electric furnace, i.e. each cracking coil is either exclusively heated by electric energy or exclusively by firing.

The term "predominantly" may, herein, refer to a proportion or a content of at least 50%, 60%, 70%, 80%, 90% or 95%.

The term "rotating equipment", as used herein, may relate to one or more components selected from a compressor, a blower, a pump and a generator, such rotating equipment drivable by a source of mechanical energy such as an electric motor, a steam turbine or a gas turbine.

A "multi-stream heat exchanger" is a heat exchanger in which particularly the medium to be cooled is passed through a plurality of passages such as in a "transfer line exchanger" as e.g. mentioned in the Ullmann article mentioned at the outset.

To the knowledge of the inventors, there has been no description of a dedicated optimization of fired cracking furnace design and operation to steamcracker plants which do not feature steam turbines for the recovery of mechanical energy needed for driving the main gas compressors in the separation section of the plant, or for generating electrical power. Such a solution is provided according to the invention, which therefore allows for an effective operating of corresponding plants for the first time.

The invention proposes new process solutions in terms of furnace design and operation for such a setup. In simple words, the invention provides a solution to the following question: "How can steam generation devices be modified if steam consumers are drastically modified?" As mentioned, substituting potentially carbon dioxide emitting parts of a steam cracking parts has a strong influence on the overall plant operation and is not a matter of exchanging one component against another.

As mentioned, in current steamcracker plants, the steam exported from the furnaces is consumed by both turbine drives (mechanical energy recovery) as well as by heat exchangers (thermal energy recovery), leading to a combined heat and power system. By electrifying the compressor drives, one can benefit from renewable electricity import and reduce the exergy losses caused by steam turbine driven compressors or electric generators, which could generally also be used. In return, the modified steam system is preferably reduced to a heat recovery system.

The invention therefore presents cracking furnace concepts that are specifically aimed at integration into steamcracker plants without or at least without large-scale mechanical energy recovery, which take advantage of this modified use-case to optimize the furnace operation in terms of emission and energy efficiency.

The existing prior art contains no example on how to solve these tasks, because known fired furnace integration concepts rely on generating steam intended for mechanical energy recovery, as such steam is available in abundance.

In some documents mentioned above, the problems mentioned above are present as well, as they include embodiments combining fired furnaces with a partly electrified separation train. The provision of a feed-effluent exchanger is indicated, without giving detailed information about apparatus design or answering open questions about practical realization. The embodiments known from the state-of-the-art include the production of highly superheated steam in the convection section, with conventional export steam conditions suitable for usage in a steam turbine, e.g. driving the cracked gas compressor. The solutions provided according to the invention are not proposed, however.

According to the invention, a method of steam cracking using a steam cracking arrangement including one or more fired cracking furnaces, one or more quench cooling trains and one or more compressors and/or pumps as rotating equipment is proposed, wherein one or more process gas streams is or are passed at least through the one or more fired cracking furnaces and the one or more quench cooling trains, and wherein the rotating equipment is at least partly driven by electric energy. The rotating equipment may particularly form part of one or more separation trains of the steam cracking arrangement, or it may be adapted to prepare the one or more process gas streams, or one or more gas streams formed therefrom, for being separated in such one or more separation trains. A separation train may be embodied as generally known from literature and may include steps or equipment selected from demethanizers, deethanizers, depropanizers, splitters, hydrogenation units, absorption columns, rectification columns, refrigeration units, adsorption arrangements and heat exchangers.

According to the invention, a steam generation arrangement is operated in thermal association with the steam cracking arrangement and may also form part thereof, wherein using the steam generation arrangement at least superheated high pressure steam at a first pressure level between 30 and 175 bar absolute pressure and at a first temperature level and substantially no steam at a higher temperature level than the first temperature level is generated. The term "substantially no steam" shall, in this connection, particularly refer to a steam amount of less than 10% of the total steam amount generated in the steam generation arrangement.

Further according to the invention, the superheated high pressure steam at the first pressure level and the first temperature level is at least in part adiabatically and isenthalpically expanded to a second pressure level below the first pressure level, the second pressure level being particularly, but not necessarily, above 20 bar absolute pressure, such that its temperature level is lowered, only by the adiabatic and isenthalpic expansion, to a second temperature level. The first temperature level is selected such that each intermediate temperature level reached at intermediate pressure levels of more than 20 bar during the adiabatic and isenthalpic expansion process is between 5 and 120 K, particularly between 10 and 100 K, further particularly between 20 and 80 K above the dew point of steam at the respective intermediate pressure level during the adiabatic and isenthalpic expansion. In other words, the expanded steam is, by selecting the first temperature level according to the invention, kept at moderate superheating levels, while simultaneously being held with a sufficient distance from the boiling point curve throughout the process of expansion for all intermediate pressure levels above 20 bar. The latter is particularly relevant in the case of an expansion starting from a first pressure level of more than 40 bar as in such cases the two-phase region may be reached or at least temporarily passed. This is avoided according to the invention. Furthermore, by limiting the steam superheating according to the invention, the heat exchange duty at high temperatures in the non-essential steam generation process is reduced, thereby increasing the availability of high-temperature heating resources for essential process heating purposes, e.g. feed preheating.

The superheated high pressure steam at the first pressure level and at the first temperature level does preferably not include steam generated from process water and preferably includes only steam generated from boiler feed water. The superheated high pressure steam is therefore preferably high-purity steam as defined above. The superheated high pressure steam is preferably not used in forming the one or more process gas stream, i.e. it does not participate in the steam cracking reactions.

In other words, according to the invention only a moderately superheated high-purity steam stream is generated and exported at a corresponding pressure level, i.e. the first pressure level, the term "exported" relating in this connection to a withdrawal from the steam generation arrangement and not, or not necessarily, from an overall system. This steam may also be referred to as "dry" steam as its superheating level is selected essentially to prevent condensation, which may e.g. result in abrasion during steam transport. For any possibly applied adiabatic and isenthalpic expansion down to a minimum pressure, i.e. the second pressure level, the resulting dew point margin of the steam flow at any intermediate pressure level above 20 bar during the expansion is in the ranges already mentioned before.

The invention proposes, with the measures mentioned already above and particularly further described below, novel concepts which redesign fired steamcracker furnaces in the context of highly electrified overall steamcracker plant designs.

The proposed solution to limit the superheating of high pressure steam breaks with the current state-of-the-art in steamcracker designs based on conventional fired furnaces and turbine-driven large rotating equipment. This technological choice represents a very efficient solution in the context of highly electrified steamcracker designs, "highly electrified" relating to the rotating equipment but not to the steam cracking furnaces themselves, which are, in contrast to the rotating equipment, still provided at least in part as fired furnaces according to the invention.

Indeed, the current practice of producing highly superheated high pressure steam in the furnace section (at dew point margins of typically more than 150 K at the furnace outlet) is driven by the abundance of thermal waste energy in the convection sections and its possible use in steam turbines for driving compressors and pumps or electric generators. Reduced pressure steam taken from turbine extractions or turbine outlets is furthermore used for providing process heat at various levels. Therefore, in classical arrangements, flexibility in generating and using steam is limited.

In highly electrified cracker separation trains, the use of electric compressor drives instead of steam turbines leads to a reduction of exergy losses. Therefore, after removal of steam turbines, there is no more efficient use for highly superheated high pressure steam in the separation train. Hence, by reducing the level of superheating, the invention allows for using a large portion of the thermal energy recovered in the quench and convection sections of the furnace for the necessary preheating of the main process stream or its components, i.e. the feed hydrocarbons and/or process steam. Furthermore, and as described further below, such thermal energy may be used in preheating combustion air with which a fuel is combusted.

According to a particularly preferred embodiment of the invention, therefore, the one or more process streams, before being passed through the one or more fired cracking furnaces, or feed hydrocarbons and/or process steam used in generating the one or more process streams, is at least in part heated using heat withdrawn from the one or more process streams downstream of the one or more fired cracking furnaces, or more precisely of the radiant zone, i.e. from the "process gas" or "cracked gas" formed therein.

The heat withdrawn from the one or more process streams downstream of the one or more fired cracking furnaces may particularly at least in part be withdrawn from the one or more process streams downstream of the one or more fired cracking furnaces in one or more direct feed-effluent heat exchangers, i.e. one or more heat exchangers in which, or in each of which, the process stream or one of the process streams downstream of the one or more fired cracking furnaces is or are brought into direct thermal contact with the one or more process streams before being passed through the one or more fired cracking furnaces, or the feed hydrocarbons and/or the process steam used in generating the one or more process streams, wherein a "direct thermal contact" is to be understood herein as being realized by a heat transfer through one or more (metallic) interface layers of the one or more direct feed-effluent heat exchangers but not by a heat transfer via an intermediate heat-exchange fluid.

Alternatively or additionally, the heat withdrawn from the one or more process streams downstream of the one or more fired cracking furnaces may at least in part be withdrawn from the one or more process streams downstream of the one or more fired cracking furnaces using steam which is thereafter used in heating the one or more process streams before being passed through the one or more fired cracking furnaces, or the feed hydrocarbons and/or the process steam used in generating the one or more process streams.

In one particularly preferred embodiment of the invention, at least a part of the feed preheating, i.e. of heating the one or more process streams, before being passed through the one or more fired cracking furnaces, or the feed hydrocarbons and/or the process steam used in generating the one or more process streams, or air used in combustion, may be performed against saturated or moderately superheated high pressure steam in a multistream heat exchanger of the steam generation arrangement.

In all embodiments of the invention, the moderate superheating in the given range, i.e. at the first temperature level, further allows a straightforward and flexible heat supply to process heat consumers, as the distribution to consumers at different temperature levels can simply be done by monophasic and adiabatic expansion of the moderately superheated steam exported by the furnaces, without need for letdown stations for entire steam levels, particularly involving additional boiler feed water injection for desuperheating, and/or turbine stages as in classical arrangements. In classical arrangements, such measures are necessary as the steam parameters and the steam expansion of superheated steam is largely governed by the steam requirements of the rotating equipment driven thereby.

The steam generation arrangement is particularly used for generating saturated steam and for moderately superheating the saturated steam thereafter. Saturated steam generation may, according to the invention, be predominantly or entirely be performed in the one or more quench cooling trains, i.e. in one or more primary and/or secondary quench exchangers, while the moderate steam superheating provided for according to the invention may predominantly or entirely be performed in one or more convection sections, particularly in heat exchanger bundles located in between feed preheating bundles. The steam superheating can be done in one or more superheating steps, with or without intermediate boiler feed water injection. A certain degree of boiler feed water preheating can be performed in an economizer bundle and/or in one or more secondary or tertiary quench exchangers. The terms "primary", "secondary" and "tertiary" are used, in connection with the quench exchangers, essentially to refer to their position in the quench cooling train while a fixed association in terms of process duty may not be present. Current state-of-the-art for liquid feed furnaces foresees two quench exchangers while three quench exchangers are typically provided for gas feed furnaces. In older furnace designs, setups with only one quench exchanger are commonly found. In standard furnace designs, primary exchangers typically cool against evaporating boiler feed water. Secondary quench exchangers can (partly) vaporize boiler feed water or preheat boiler feed water. Tertiary quench exchangers typically preheat boiler feed water. Noticeable exceptions are those in which quench exchangers are used to preheat the feed.

In terms of dynamic behaviour, the possibility to balance and buffer changes in hydrogen or other fuel gas consumption with the steam system (see below for further details) facilitates the integration of such furnace systems in industrial complexes preferably supplied with renewable electricity.

The level of steam superheating provided according to the invention is very suitable if the steam flow exported from the furnace system is solely intended for supplying process heat to consumers. By mere isenthalpic expansion it can be reduced without a phase change to the pressure and temperature levels required by the heat sink, i.e. the heat "consumers". According to the invention, therefore, preferably no steam generated by the one or more steam generation arrangements is used in steam turbine drives delivering shaft powers of more than 1 MW, and preferably not in steam turbine drives or other rotating equipment at all. In other words, according to the invention no steam turbines and at least no steam turbines delivering shaft powers of more than 1 MW, are used which are supplied with steam from the steam generation arrangement(s).

Particularly, preheating combustion air used in firing the one or more fired cracking furnaces leads to lower fuel gas consumption and reduced flue gas emissions. This is considered more efficient than using conventionally superheated steam to produce electricity and is therefore provided for according to an embodiment of the invention using any means suitable and resulting in a combustion air temperature level of above 100° C., preferably above 150° C., more preferably above 200° C., most preferably above 300° C. and e.g. up to 1000° C. Such combustion air preheating may be less advantageous in classical arrangements relying on the large amount of heat of flue gas streams needed for steam production.

In one embodiment, the combustion air is preheated outside the flue gas pathway, also referred to as "external" combustion air preheating. The combustion air preheating is in this embodiment preferably performed by using saturated steam produced in the one or more quench cooling trains, and therefore in one or more multistream heat exchangers forming part of the steam generation arrangement. Alternatively, moderately superheated steam can be used solely or in addition to saturated steam in combustion air preheating. Moreover, external steam taken e.g. from one of a plant's central steam headers, may also be used for at least part of the combustion air preheating process. At least a part of an air preheating section may be bypassed by at least a fraction of the overall gas stream, in order to be able to modify the resulting combustion air preheat temperature during operation.

In a different embodiment, the combustion air is preheated in the flue gas pathway, also referred to as "internal" combustion air preheating. In this embodiment, a combustion air preheating system can comprise one or more multistream heat exchangers with flue gas as hot medium and combustion air as cold medium. In case of a multi-step combustion air preheating, it is also possible to recover heat from flue gas for other process purposes, in between two combustion air preheating steps. Like for (external) combustion air preheating outside the flue gas pathway, at least a part of the combustion air preheat section may be bypassed here by at least a fraction of the overall gas stream, in order to be able to modify the resulting combustion air preheat temperature during operation.

For internal and/or external combustion air preheating, a combustion air compressing device, typically located upstream of the combustion air preheating section, which compensates for the pressure drop of the combustion air preheat exchangers, may be provided. The preferred pressure on the firing side of the radiant section lies in the typical slightly subatmospheric range as in conventional cracking furnaces without air preheating. Consequently, an additional flue gas blower/compression device may preferably be located downstream of the convection section outlet.

The furnace system can preferably be operated in energy-flexible manner, i.e. a given chemical production load of a furnace can be provided at differing total fuel gas consumption rates and particularly also involving using different amounts of gas being subjected to steam cracking in the form of the one or more process streams. The corresponding differences in chemical energy input can be balanced by a varying energy output in the form of steam, by varying the first temperature level and/or the steam export quantity, i.e. the amount of the superheated high-pressure generated. In other words, according to an embodiment of the invention, the steam cracking arrangement is operated, in different operating modes, using different total fuel gas consumption rates and particularly also different gas amounts provided in the form of the one or more process streams.

According to a further embodiment of the invention, a fuel gas used in firing the one or more fired cracking furnaces may be heated to a temperature level which is varied during the furnace operation.

A fuel gas used in firing the one or more fired cracking furnaces preferably has a hydrogen content between 0 and 100 wt.-%, preferably between 20 and 100 wt.-%, most preferably between 50 and 100 wt.-%. In this embodiment, in case of a higher hydrogen content, the fuel gas used in firing the one or more fired cracking furnaces may also at least in part be provided using hydrogen generated in an electrolysis or ammonia decomposition unit whose operation may also be part of the method provided according to the invention.

According to the invention, greenhouse gas emissions from the system used may be reduced by 20% to 100%, preferably by 30% to 100%, more preferably by 50% to 100%, as compared to conventional fired furnaces, a conventional fired furnace in this context being operated without combustion air preheating and using a conventional fuel mixture of tail gas (from the cold section of the cracker) and natural gas import.

For further details in relation to the steam cracking system provided according to the invention and preferred embodiments thereof, reference is made to the explanations relating to the inventive method and its preferred embodiments above. Advantageously, the proposed arrangement is adapted to perform a method in at least one of the embodiments explained before in more detail.

Before turning to the more specific description of embodiments of the invention with reference to the Figures, again some details and concepts of the invention and some embodiments will be referred to.

Although it might appear counterproductive or inefficient to expand the exported steam without mechanical energy recovery, one must take into account that the primary energy supply of the claimed furnace is much reduced compared to conventional fired furnaces and that it is preferably supplied in the valuable form of a hydrogen-rich fraction. In that sense the invention offers an additional pathway to rearranging the energy balance in fired furnaces (less steam production, more feed preheating). The invention goes beyond known concepts also by strictly targeting a minimum primary energy consumption in the furnace section and adapting the furnace design/operation to highly electrified separation train topologies.

Indeed, raising the steam superheating level in such a furnace would lead to increasing its overall primary energy demand, what cannot be fully compensated by recovering mechanical energy or electricity in a downstream turbine. Taking into account non-ideal process performance, it is hence from a systems perspective (to a large extent) and from a process/energy perspective (to a smaller extent) more efficient to adiabatically and isenthalpically expand the moderately superheated steam required by process heat consumers. This holds even more true for plants with additional loss generators in the fuel gas provision, e.g. where the hydrogen fired in the furnaces is at least partially provided by electrolysis units and/or ammonia decomposition units.

By limiting the steam usage for process heat purposes and setting steam parameters accordingly, the steam system can be operated flexibly and can further be used as temporary energy buffer, e.g. by varying the steam superheating and/or pressure levels during operation. This is facilitated by the fact that the produced steam is not used for power generation in steam turbines, which are less tolerant regarding variations of steam conditions than steam-based heat exchangers.

During plant operation, the invention allows for instance to modify the air preheating temperature, e.g. by bypassing a certain fraction of the combustion air around one or more preheat exchangers. This will affect the fuel gas consumption, as well as the steam production, and can be used to adapt the plant's temporary energy management. This may be of significant interest if the furnaces use fuel gas partially originating from electrolyser units (or ammonia decomposition units) or if they are combined with electric furnaces in a hybrid plant architecture. The steam production and superheating can also be adapted by varying the optional boiler feed water injection in between two superheating sections.

In general terms, variations of steam production can be done according to the invention by a number of different means, e.g. by changing set points of stream characteristics (temperature, pressure, flow), by (partially) opening/closing bypass lines, by varying equipment-specific process parameters (heat duty, operating pressure) or other changes in process parameters.

Furthermore, the pressure levels in the steam header systems outside of the furnace systems can be varied in embodiments of the invention during operation to create additional buffer capacity in terms of overall steam quantity. Indeed, the overall heat storage capacity results from the summed steam inventory and corresponding heat capacity in the steamcracker, i.e. including all steam header lines between furnaces and steam consumers at different pressure levels.

Further features and embodiments of the invention are listed hereinbelow. All these features and embodiments can be combined with the features and embodiments described hereinbefore and hereinafter without limitation, as far as being encompassed by the scope of the claims and as far as technically feasible or sensible.

The invention is preferably combined with a separation train, in which all gas compressors or pumps with power duties above 1 MW are driven by electric motors.

The exported superheated high pressure steam is most advantageously distributed to various steam pressure levels by adiabatic and isenthalpic expansion elements. Singular heat consumers (e.g. with critical fouling service) may further include an additional desuperheating step (which may be performed by direct water injection or by using a saturation drum).

Steam cracking arrangements comprising features according to the invention may further include in a hybrid system architecture electrically heated furnaces which may be operated according to any possible electric heating principle such as direct resistive coil heating, indirect radiative coil heating by electric heating elements, and coil heating using inductive power transmission. The steam cracking arrangement may include other units for steam generation from electric energy (e.g. electric heat pump systems and electric boilers).

The exported superheated steam can be expanded to pressure steam levels below 20 bar absolute pressure, e.g. to supply medium and low pressure steam consumers. The selection of 20 bar absolute pressure as lower limit for the characterization of dew point margins at intermediate pressure levels is chosen to facilitate the definition of the curve envelopes for the initial steam superheating, such that the mentioned distance to the boiling point curve is given for all intermediate or second pressure levels above 20 bar. When expanded to pressures below 20 bar absolute pressure, higher values of dew point margins may occur, without limiting the scope of the invention.

In addition to the inherent energy storage possibility through variation of steam superheating/pressure, the invention can further be combined with dedicated energy storage systems, e.g. latent heat storage systems or similar.

The invention is preferably combined with a separation train in which all or most of the available hydrogen (typically 70, 75 or 80 to 100%) is recovered in the form of a process stream predominantly composed of hydrogen and used for firing in the furnaces.

The furnace system according to the invention is preferably used in steamcracker plants or systems including an electrolyzer unit which produces hydrogen from electricity import, preferably produced by regenerative means. Alternatively, or additionally, the plant or system may feature an ammonia decomposition unit, producing hydrogen from imported ammonia (the latter being preferably produced using renewable electricity at a different location).

An embodiment with a feed-effluent primary quench exchanger and moderate steam superheating is also covered by the invention.

The invention and embodiments thereof are further explained in connection with the appended drawings.

Figure 2:
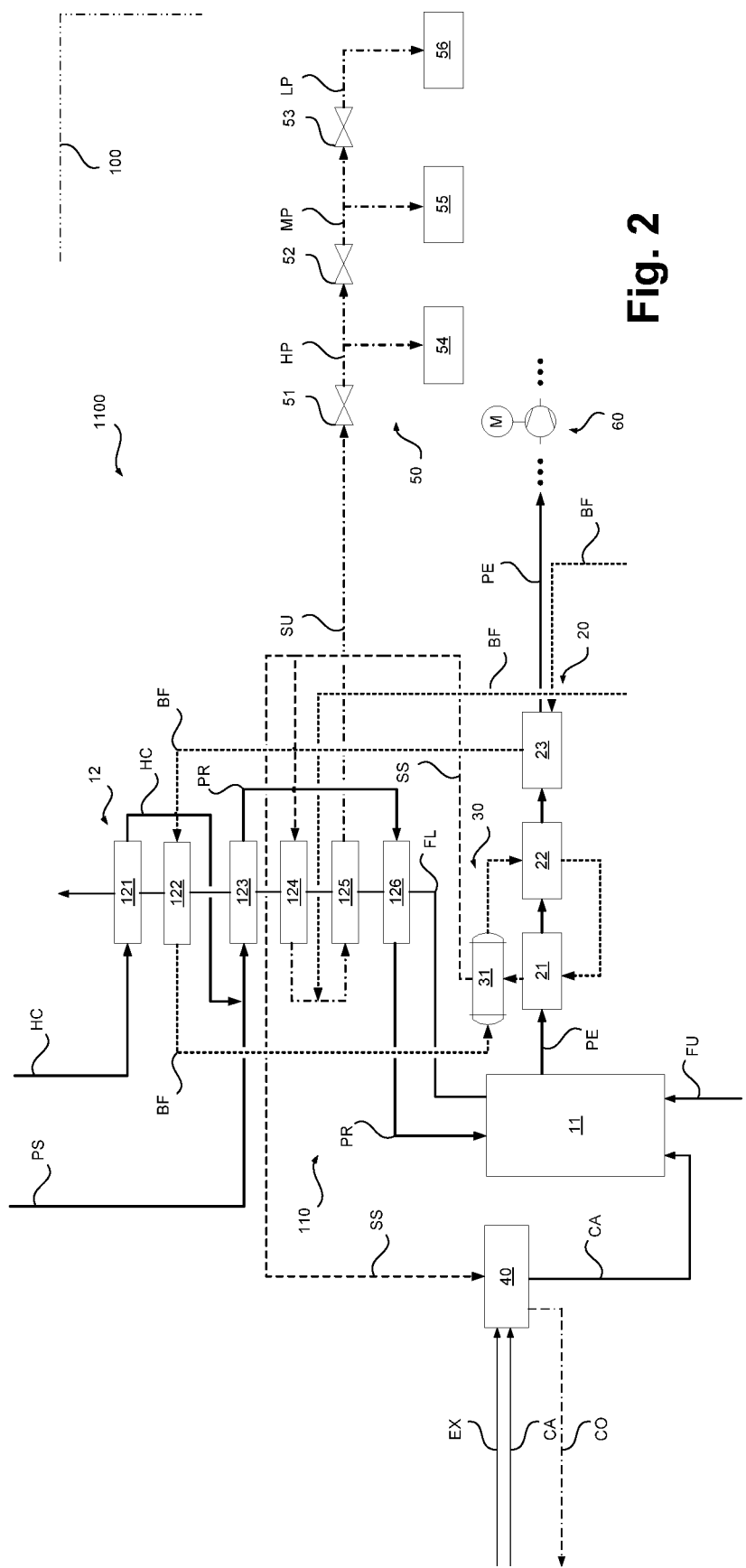
FIGS. 2 to 6 illustrate embodiments of the invention.

In FIG. 2, a steam cracking arrangement 1100 according to an embodiment of the invention, used in implementing a method of steam cracking according to an embodiment of the invention, and optionally being part of a system according to the invention is illustrated. As in the subsequent Figures showing steam cracking arrangements as well, method steps of the method may be realized by corresponding process units or devices used and explanations relating to method steps may therefore likewise relate to such process units and devices and vice versa. Repeated explanations are omitted for reasons of conciseness only and mixed language describing the arrangements or systems and the methods according to the embodiments of the present invention is used for clarity. If components are described in the singular, this does not exclude that such components are provided in plurality. The steam cracking arrangement 1100, such as the other steam cracking arrangements shown below, may be part of a system 100 according to an embodiment of the invention which may include a plurality of further components and whose possible system boundaries are very schematically illustrated in FIG. 2 only.

Figure 10:
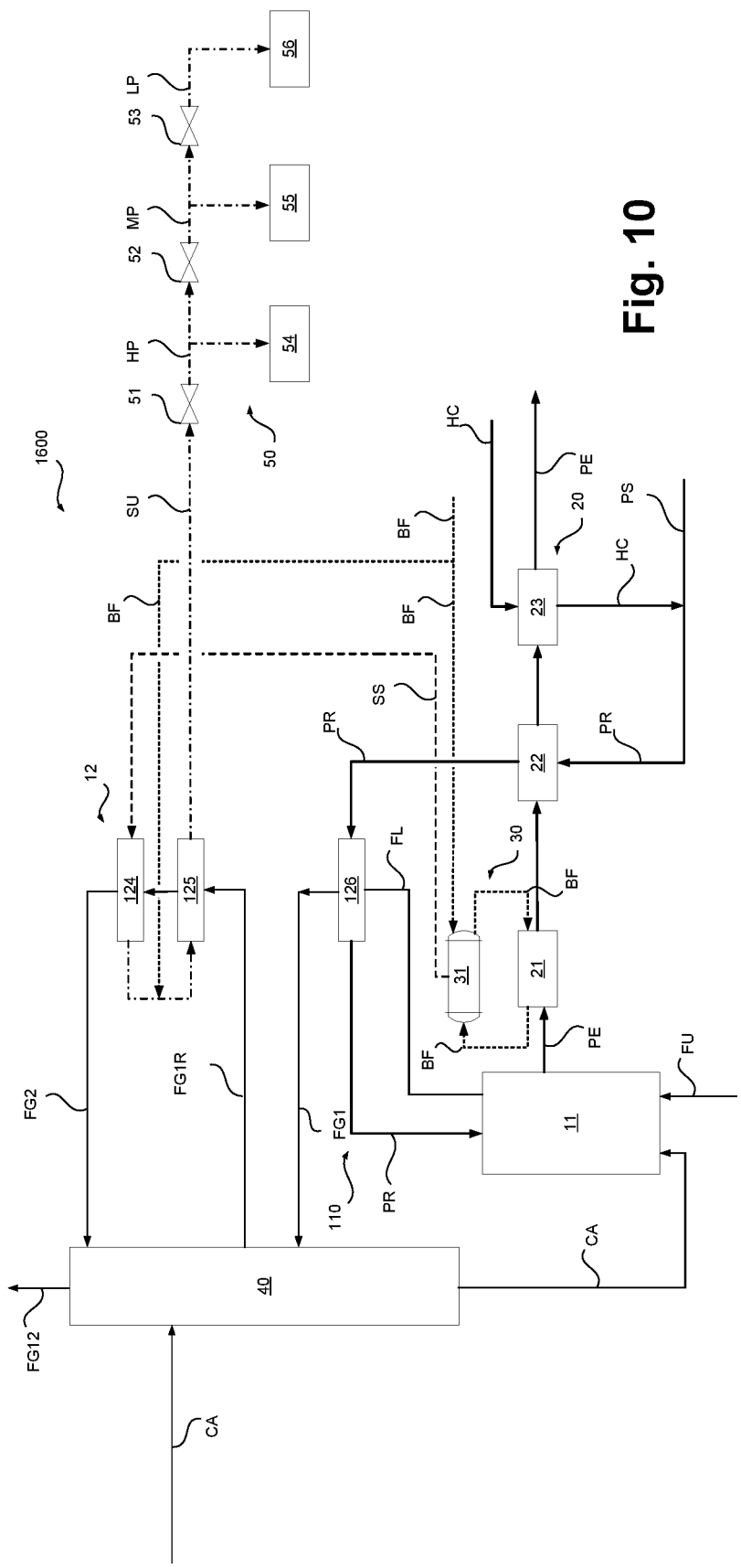
FIG. 10 illustrates a further embodiment of the invention.

In FIGS. 2 to 6 as well in FIG. 10, thick solid arrows indicate hydrocarbon feed, process steam, process gas, or cracked gas streams and streams formed therefrom, such as hydrocarbon fractions. Thin solid arrows refer to fuel gas, air, flue gas and vent streams. Finely dotted arrows indicate liquid boiler feed water streams, while dashed arrows indicate saturated high-purity steam streams, and dash-dotted arrows indicate superheated high-purity steam streams. Condensate streams are indicated with double-dash dotted arrows.

The steam cracking arrangement 1100 includes using a fired steam cracking furnace 110 which is formed by or includes a fired radiant zone 11 and a convection zone 12, as generally described before. In the convection zone 12, a feed preheater 121, an economizer 122, a first high temperature coil 123, a first steam superheater 124, optionally a second steam superheater 125 and a second high temperature coil 126 are arranged in a flue gas channel or duct in the embodiment shown. A flue gas stream FL is passed from the radiant zone 11 through the convection zone 12, leaving the convection zone 12 at a temperature level of, in the present embodiment, about 89° C. The radiation zone 11 is fired using a fuel gas stream FU and combustion air CA which is, in the example shown, preheated to a temperature level of about 300° C.

A primary quench exchanger 21, a secondary quench exchanger 22 and a tertiary quench exchanger 23 are arranged in a process gas pathway, forming a quench cooling train 20 of the steam cracking arrangement 1100.

A steam generation arrangement 30 is provided and includes a steam drum 31 and other components used in generating steam. Generally, if throughout the description, reference is made to a component belonging to one arrangement or group of components primary described with a certain function, this does not exclude that this component is not also part of a different arrangement or group of components having an additional or different function, as typical for a plant comprising interconnected parts. For example, the primary quench exchanger 21, the secondary quench exchanger 22 and the third quench exchanger 23 are described here as being part of the cooling train 20, but they are also integrated into the steam generation arrangement 30.

A combustion air preheating unit 40, which is arranged externally to the flue gas duct and therefore externally to the convection section 12 in the embodiment shown in FIG. 2, is also part of the steam cracking arrangement 1100.

In the method using the steam cracking arrangement 1100, process steam PS and feed hydrocarbons HC are supplied to the steam cracking arrangement 1100. The feed hydrocarbons HC are heated in the feed preheater 121 before being combined with the process steam PS, forming a process stream PR which is further heated in the high temperature coils 123 and 126 before being supplied to the fired radiant zone 11. The process stream, now also referred to as cracked gas or process gas and indicated with PE for clarity, is withdrawn from the radiant zone 11 and quench cooled in the primary quench exchanger 21, the secondary quench exchanger 22 and the tertiary quench exchanger 23 as generally described before.

Thereafter the process stream PE may be, as only shown in FIG. 2, subjected to any type of processing which includes, according to an embodiment of the invention, compression in a compressor 60, particularly a process gas compressor, which is driven by an electric motor M. As to further details, reference is made to the explanations above. Particularly a separation train is provided in which all or essentially all compressors are driven electrically.

Boiler feed water BF, as also illustrated with dotted arrows, is heated in the tertiary quench exchanger 23 and in the economizer 122 before being supplied to the steam drum 31 from which a boiler feed water BF circuit is also formed through the secondary and primary quench exchangers 22, 21. Saturated steam SS withdrawn from the steam drum 31, as also illustrated with dashed arrows, is partly superheated in the steam superheaters 124, 125, forming (moderately) superheated high pressure steam SU, as also illustrated with dash-dotted arrows, and partly supplied to the combustion air preheating unit 40. Parameters of the superheated high pressure steam SU have been extensively described before. In the embodiment shown, this may have a temperature of about 380° C. and an absolute pressure of about 117 bar. Between the steam superheaters 124, 125, further boiler feed water BF may be added (so-called boiler feed water injection) which is preferably not preheated and which is particularly used to generally control the heat balance within the convection zone 12, e.g. for an adaptation to different operating points. If no boiler feed water injection is provided, the steam superheater 125 may also be omitted.

Combustion air CA to be preheated and optionally external steam EX are also supplied to the combustion air preheating unit 40. From the combustion air preheating unit 40, a condensate stream CO is withdrawn which may be used as a part of the boiler feed water BF extensively discussed before.

In a steam utilization arrangement, which is denoted 50 for reference purposes only, the superheated high pressure steam SU is used for heating purposes but preferably not substantially for driving rotary equipment. Herein, the superheated high pressure steam SU is adiabatically and isenthalpically expanded using expansion units 51, 52, 53, forming high pressure steam HP, medium pressure steam MP and low pressure steam LP which is supplied to heat consumers 54, 55, 56. Steam (high-pressure or super-high-pressure steam) exported from all furnaces may be collected in a corresponding steam header, i.e. a large-volume piping system which distributes the steam over the plant to the different consumers. The supply connection to the lower pressure steam headers is made from this highest pressure header. In conventional plants, such a steam header is operated at approx. constant pressure (for operation of the turbines), which is slightly below the steam export pressure at the furnace outlet. According to embodiments of the invention, the pressure level of the highest pressure steam header can be varied more extensively, to achieve an advantageous buffer effect.

Summarizing the above, in the steam cracking arrangement 1100 according to FIG. 2, the combustion air CA is preheated outside the flue gas pathway ("external air preheating"). The saturated steam SS production is entirely done in the quench cooling train 20 (with the primary and secondary quench exchangers 21, 22), while the moderate steam superheating is done in the convection section 12 in between the high temperature coils 123 and 126. The steam superheating can be done in one or more superheating steps, with or without intermediate boiler feed water injection. A certain degree of boiler feed water preheating can be done in an economizer 122 and/or in a tertiary quench exchanger 23, as shown.

The combustion air preheat is preferably done by using saturated steam SS produced in the quench section 20, in one or more multistream heat exchangers. Alternatively, moderately superheated steam can be used solely or in addition to saturated steam in the air preheat section (not shown in FIG. 2). Moreover, external steam EX taken, e.g. from one of the plant's central steam headers, may also be used for at least part of the combustion air preheating process. At least a part of the combustion air preheating unit 40 may be bypassed by at least a fraction of the overall gas stream, in order to be able to modify the resulting air preheat temperature during operation.

Further not shown in the Figures is an air compressing device typically located upstream of the combustion air preheating unit 40, which compensates for the pressure drop of the combustion air preheat exchangers. The preferred pressure on the firing side of the radiant section and further details were mentioned before.

Figure 3:
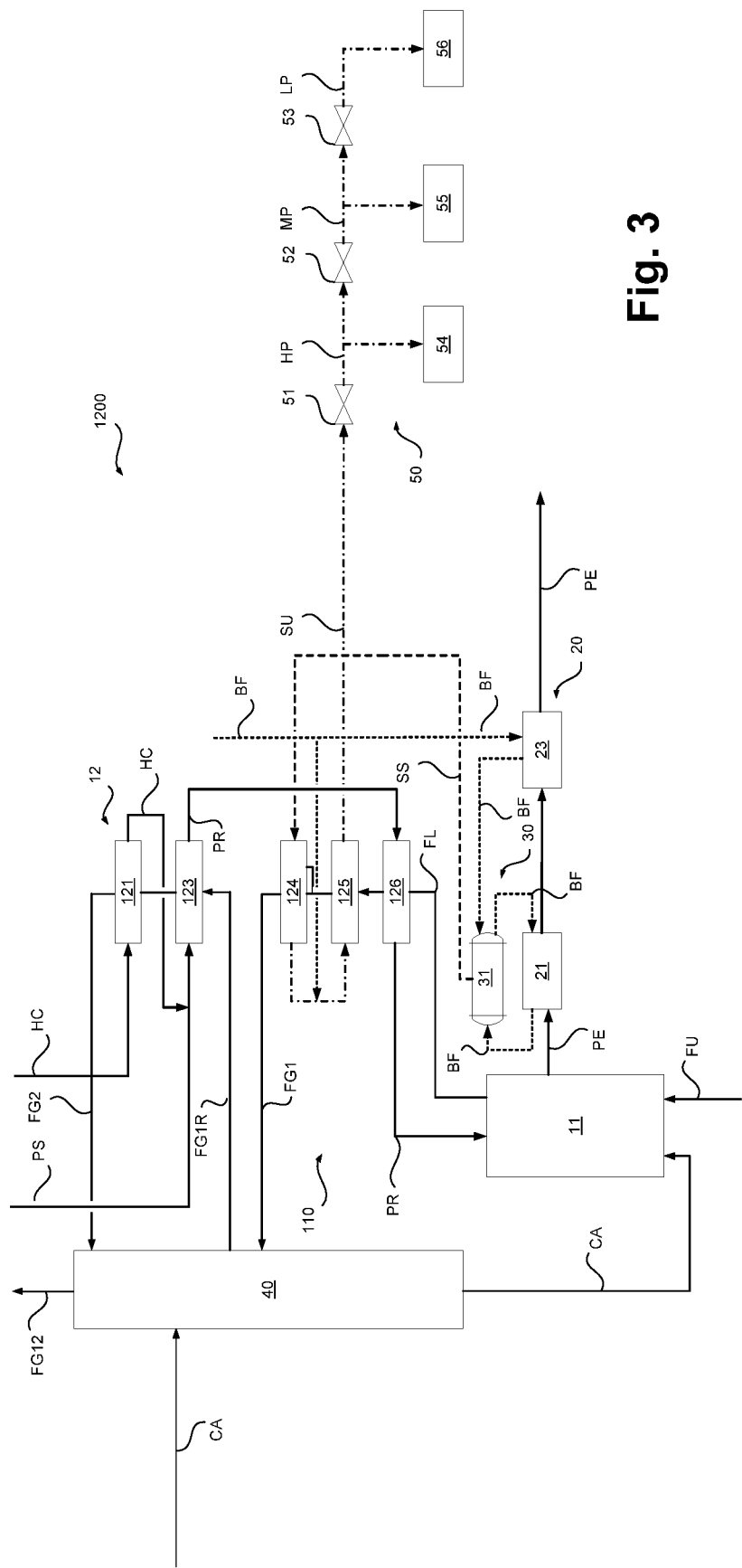

In FIG. 3, a further steam cracking arrangement 1200 according to an embodiment of the invention is illustrated. Generally, the explanations relating to the steam cracking arrangement 1100 according to FIG. 2 likewise apply to the steam cracking arrangement 1200 according to FIG. 3 and only differences will be explained below.

In the steam cracking arrangement 1200 according to FIG. 3, the combustion air preheating unit 40 is integrated into the flue gas channel or duct and is also not supplied with saturated steam SS as in the steam cracking arrangement 1100 according to FIG. 2. The economizer 122 is omitted in the convection section 12 and consequently boiler feed water BF is not heated in the convection section 12 in such an economizer. The quench cooling section is now composed of only two exchangers 21 and 23, with the quench exchanger 22 being also omitted. The boiler feed water BF is preheated in the secondary quench exchanger 23 and the steam drum 31 is connected with the primary quench exchanger 21.

From a position between the first steam superheater 124 and the first high temperature coil 123, and from a position downstream of the feed preheater 121, at least parts of the flue gas FG, indicated with FG1 and FG2 in FIG. 3, are passed to the multiple stages of the combustion air preheating unit 40. A flue gas return stream FG1R from the high-temperature stage of the combustion air preheating unit 40 is then routed to the first high temperature coil 123. After being used for heating purposes in the low-temperature stage of the combustion air preheating unit 40, the flue gas leaves the combustion air preheating unit 40 at a temperature of about 70° C. in this example. Combustion air CA, but preferably no external steam EX, is supplied to the combustion air preheating unit 40 and therefore preferably no condensate stream CO is formed. The preheated combustion air CA is supplied to the radiation zone 11 at a temperature level of, in the example shown, about 280° C.

It is to be noted that other configurations and combinations of the multiple steps of a combustion air preheating unit 40 with the multiple heat exchanger bundles of a convection zone 12 can be foreseen without limiting the scope of the invention. For instance, a high-temperature stage of the combustion air preheating unit may be inserted at different points in between exchanger bundles of a convection zone 12, either further upstream or downstream than shown in FIG. 3.

Summarizing the above, in the steam cracking arrangement 1200 according to FIG. 3, the combustion air CA is preheated inside the flue gas FG pathway ("internal air preheating"). Such an air preheating system can be composed of one or more multistream heat exchangers, with flue gas FG as hot medium, and the combustion air CA as cold medium. In case of a multi-step air preheating, it is also possible, in between two combustion air CA preheating steps, to recover heat from flue gas FG for other process purposes. As for the external combustion air CA preheating as illustrated in connection with the steam cracking arrangement 1100 according to FIG. 2, at least a part of the combustion air CA preheat section may be bypassed by at least a fraction of the overall gas stream, in order to be able to modify the resulting air preheat temperature during operation.

Water boiling is, in the steam cracking arrangement 1200 according to FIG. 3, performed in a single primary quench exchanger 21, but a combination of primary and secondary quench exchangers 21, 22 (as shown in FIG. 2) can be used in equivalent manner. Moreover, this embodiment does not feature a boiler feed water BF preheating step in the convection section 12, hereby prioritizing the availability of flue gas FG heat for combustion air preheating, as explained.

Figure 4:
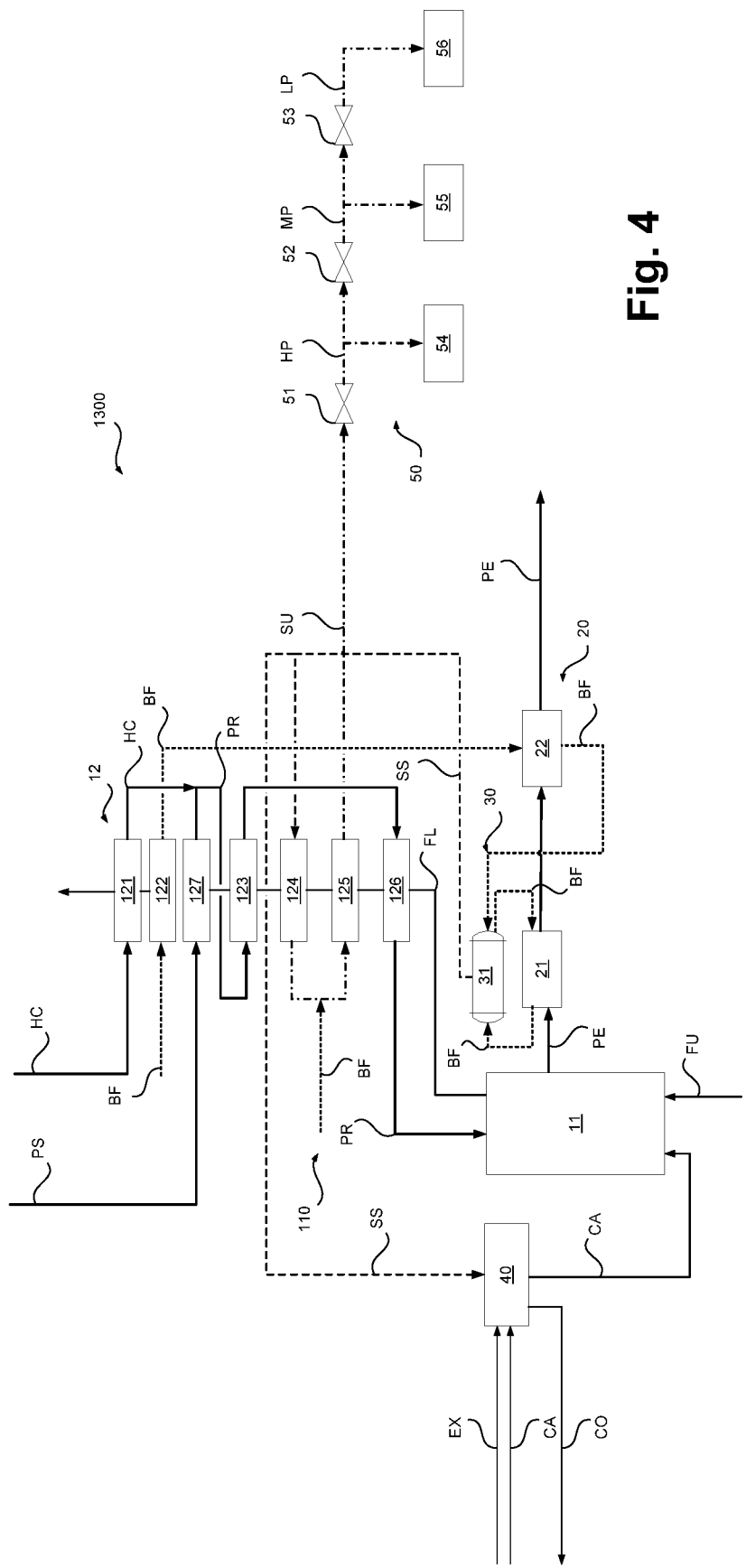

In FIG. 4, a further steam cracking arrangement 1300 according to an embodiment of the invention is illustrated. Generally, the explanations relating to the steam cracking arrangement 1100 according to FIG. 2 likewise apply to the steam cracking arrangement 1300 according to FIG. 4 and only differences will be explained below. The steam cracking arrangement 1300 according to FIG. 4 is to be considered more typical for furnaces cracking liquid feeds, whereas the steam cracking arrangements 1100 and 1200 according to FIGS. 2 and 3, respectively, show typical design features of gas feed cracking furnaces.

As compared to the steam cracking arrangement 1100 according to FIG. 2, the tertiary quench exchanger 23 is omitted in the steam cracking arrangement 1300 according to FIG. 4. Boiler feed water BF supplied to the steam drum 31 is, after preheating in the economizer 122, preheated in the secondary quench exchanger 22. The steam drum 31 is connected with the primary quench exchanger 21.

Since higher preheating duties are required for liquid feed furnaces (additional latent heat of feed vaporization), the steam cracking arrangement 1300 further includes an additional process steam superheater bundle 127, in which process steam is superheated against flue gas before being mixed with the hydrocarbon feed stream.

Figure 5:
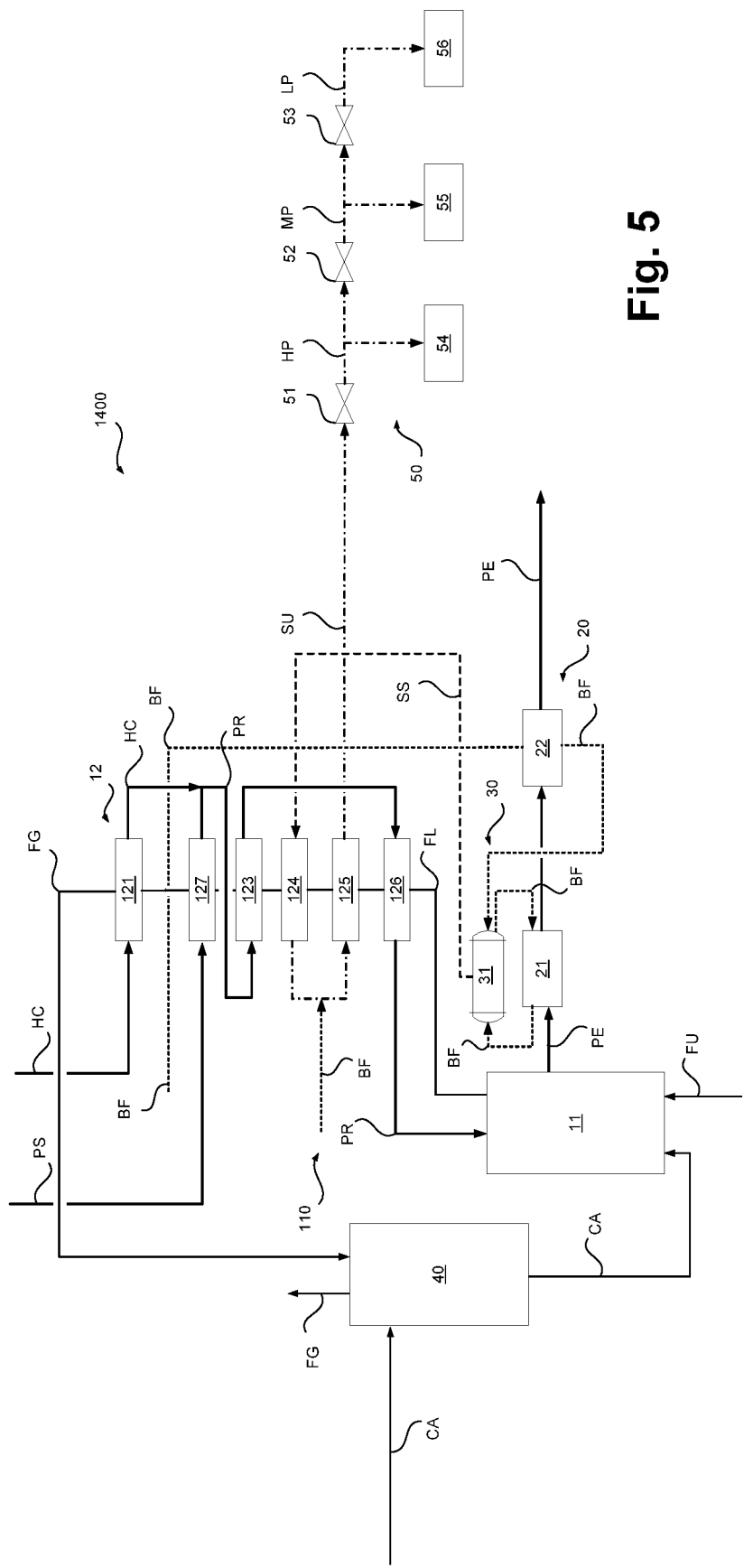

In FIG. 5, a further steam cracking arrangement 1400 according to an embodiment of the invention is illustrated. Generally, the explanations relating to the steam cracking arrangements 1200 according to FIGS. 3 and 1300 according to FIG. 4, based on the explanations relating to the steam cracking arrangement 1100 according to FIG. 2, likewise apply to the steam cracking arrangement 1400 according to FIG. 5 and only differences will be explained below. The steam cracking arrangement 1400 according to FIG. 5 particularly combines features of the steam cracking arrangements 1200 according to FIGS. 3 and 1300 according to FIG. 4.

Similarly as in the steam cracking arrangement 1200 according to FIG. 3, the combustion air preheating unit 40 is, in the steam cracking arrangement 1400 according to FIG. 5, integrated into the flue gas channel or duct and is also not supplied with saturated steam SS as in the steam cracking arrangement 1100 according to FIG. 2. The economizer 122 is omitted in the convection section 12 and consequently boiler feed water BF is not heated in the convection section 12.

As in the steam cracking arrangement 1300 according to FIG. 4, the tertiary quench exchanger 23 is omitted in the steam cracking arrangement 1400 according to FIG. 5, particularly when compared to the steam cracking arrangement 1100 according to FIG. 2. Boiler feed water BF supplied to the steam drum 31 is therefore, not being preheated in an economizer, solely preheated in the secondary quench exchanger 22. The steam drum 31 is connected with the primary quench exchanger 21.

From a position downstream of the feed preheater 121 only, particularly as compared to the steam cracking arrangement 1200 according to FIG. 3, the flue gas FG is passed to the combustion air preheating unit 40. After being used for heating purposes therein, the flue gas FG leaves the combustion air preheating unit 40 at a temperature of about 90° C. in this example.

The steam cracking arrangements 1300 and 1400 as shown in FIGS. 4 and 5 may particularly be operated with liquid feedstock. In such situations, and also in the steam cracking arrangements 1300 and 1400 as shown in FIGS. 4 and 5, a tertiary quench exchanger 23 is typically omitted, yielding higher cracked gas temperatures at the considered furnace outlet. This is advantageous to avoid condensation of heavy condensates when cooling the cracked gas further. Hence, in liquid feed crackers, the cracked gas cooling downstream of the primary quench exchanger 21 is classically done by direct contact cooling with injections of pyrolysis oil/gasoline and/or quench water. According to the embodiments of the invention shown, the primary and secondary quench exchangers 21, 22 are integrated as shown.

As the steam cracking arrangement 1300, since higher preheating duties are required for liquid feed furnaces (additional latent heat of feed vaporization), the steam cracking arrangement 1400 further includes an additional process steam superheater bundle 127, in which process steam is superheated against flue gas before being mixed with the hydrocarbon feed stream.

Figure 6:
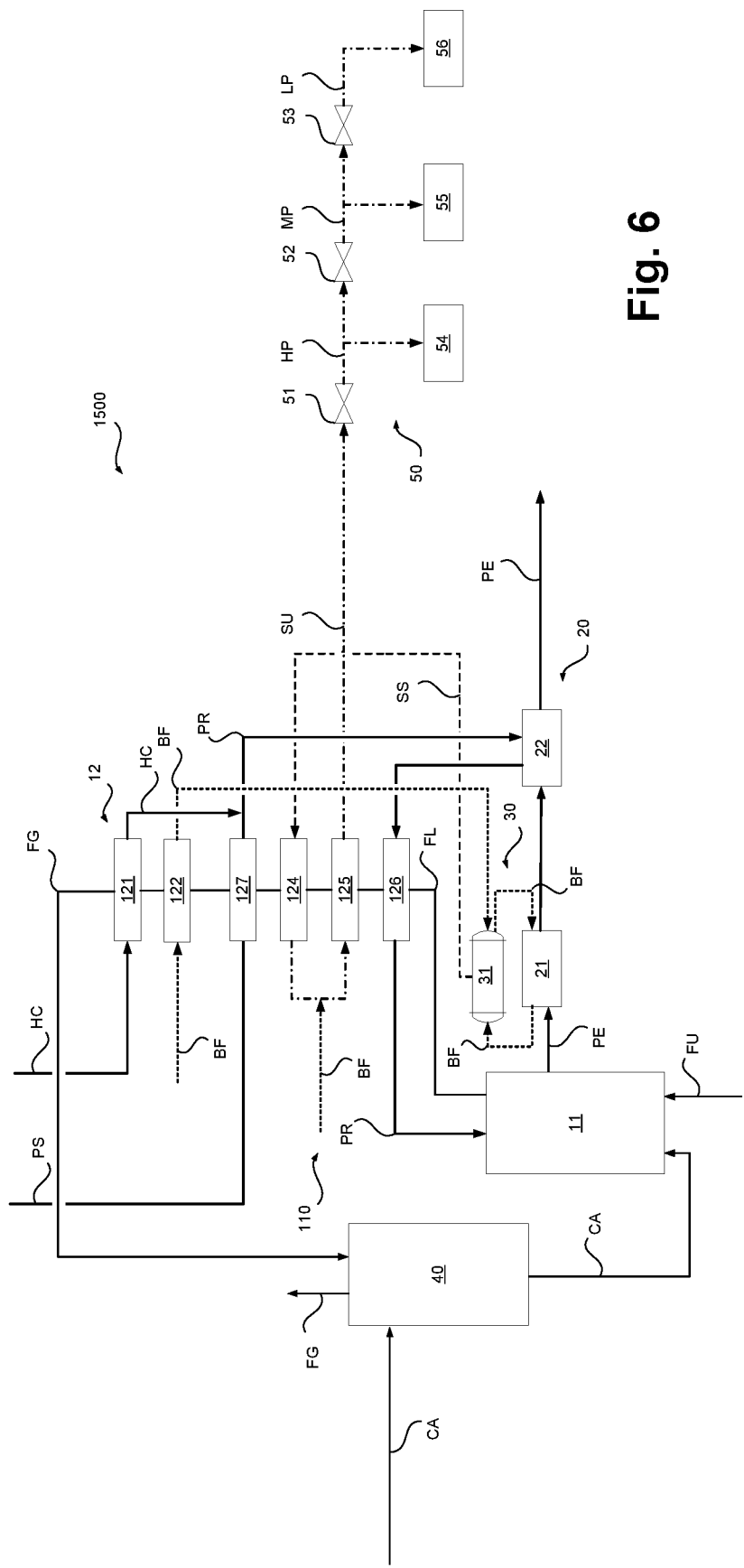

In FIG. 6, a further steam cracking arrangement 1500 according to an embodiment of the invention is illustrated. Generally, the steam cracking arrangement 1500 according to FIG. 6 shows some similarities to the steam cracking arrangement 1400 according to FIG. 5 and therefore the steam cracking arrangement 1500 according to FIG. 6 will be explained on this basis, again with reference to the steam cracking arrangements 1100 according to FIG. 2, 1200 according to FIGS. 3 and 1300 according to FIG. 4, however, where applicable.

In contrast to the steam cracking arrangement 1400 according to FIG. 5, the economizer 122 explained e.g. in connection with the steam cracking arrangement 1100 according to FIG. 2 is present, preheating the boiler feed water BF, but the first high temperature coil 123 is omitted and does not preheat the process gas stream PR.

Like the steam cracking arrangements 1300 and 1400 as shown in FIGS. 4 and 5, also the steam cracking arrangement 1500 as shown in FIG. 6 may particularly be operated with liquid feedstock. The preheating duty in liquid feed furnaces is relatively much larger than in gas fed furnaces, due to the additional vaporization enthalpy of the feed hydrocarbons HC. Moreover, as mentioned before, less heat can be recovered in multi-stream exchangers in the quench section (avoidance of heavy condensates). At the same time, to reduce fuel gas FU consumption and flue gas FG emissions, it is of interest to maximize the combustion air CA preheating.

As the steam cracking arrangements 1300 and 1400, the steam cracking arrangement 1500 further includes an additional process steam superheater bundle 127, in which process steam PS is superheated against flue gas before being mixed with the hydrocarbon feed stream HC to form the process stream PR.

The secondary quench exchanger 22 is therefore, in the steam cracking arrangement 1500 as shown in FIG. 6, provided as a feed-effluent exchanger preheating the process gas stream PR. The invention proposes a preferred positioning of this feed-effluent exchanger to be located downstream along the trajectory of the cracked gas stream PE of an additional water-boiling primary quench exchanger 21, which allows very high heat transfer coefficients and hence fast and effective cracked gas quenching.

Figure 7:
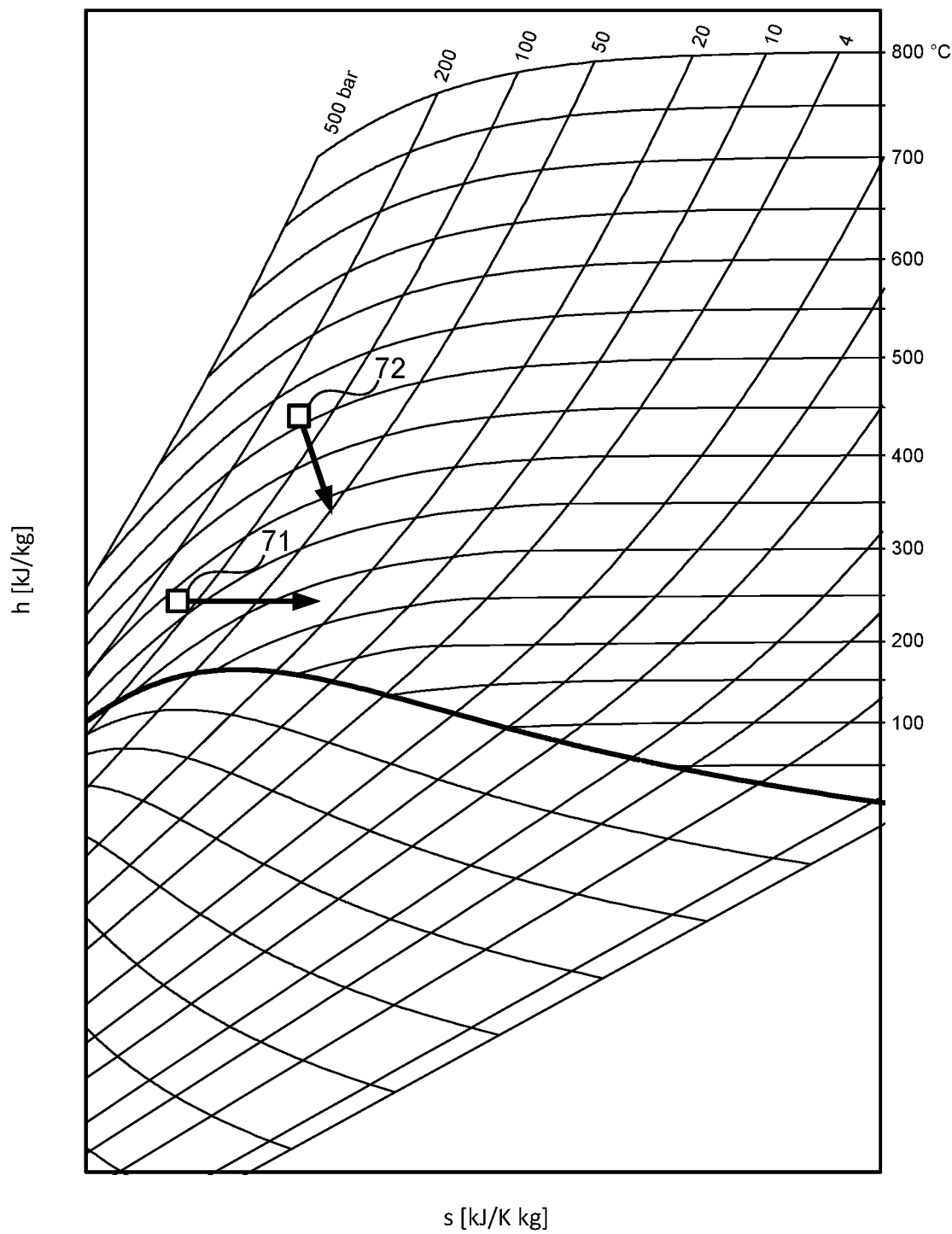
FIGS. 7 to 9 illustrate advantages of embodiments of the invention.

A particularly relevant feature of the invention and of embodiments thereof consists in limiting the level of steam superheating inside the steam cracking arrangements 1100 to 1500. As shown in FIG. 7, such moderate superheating is very suitable if the steam flow exported from the furnace system is solely intended for supplying process heat to consumers.

In FIG. 7, a Mollier (enthalpy/entropy) diagram with an entropy s in kJ/(K*kg) displayed on the horizontal axis and an enthalpy h in kJ/kg displayed on the vertical axis is shown for water. With a point 71, a moderate superheating as used according to embodiments of the invention is indicated while with a point 72, a high superheating as used according to the prior art is indicated. An adiabatic and isenthalpic expansion performed according to the invention and embodiments thereof, characteristic of a state change in valves or reducers when the steam is intended to be used for heating purposes only, is displayed with an arrow starting from point 71 while a polytropic expansion performed according to the prior art and not according to the invention, characteristic of a state change in steam turbines when the steam is intended to be first used for mechanical purposes prior to its use for heating purposes, is displayed with an arrow starting from point 72.

Figure 8:
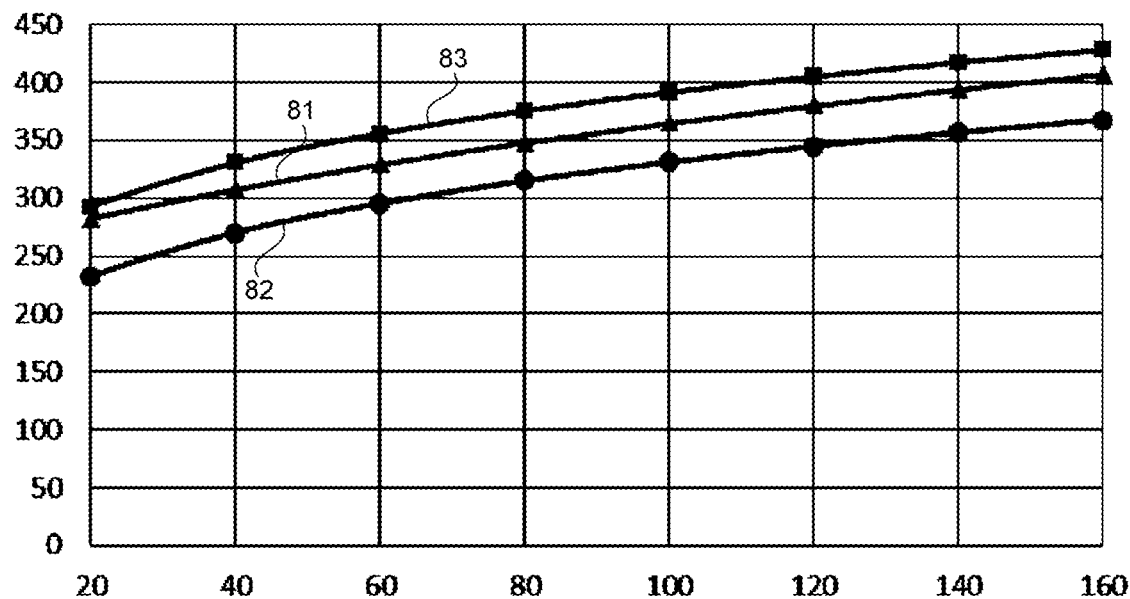

According to the invention, by mere isenthalpic expansion, the pressure can be reduced without phase change to the pressure and temperature levels required by the heat consumer. An exemplary temperature evolution curve 81 of such an isenthalpic state change (featuring a supporting point at 380° C. and 120 bar absolute pressure) is shown in FIG. 8 for a pressure range between 20 and 160 bar absolute pressure, altogether with corresponding most preferred curve envelopes 82 and 83 (with +20 K and +80 K dew point margins). In FIG. 8, an absolute pressure in bar is indicated on the horizontal axis and a temperature in ° C. is indicated on the vertical axis.

Figure 9:
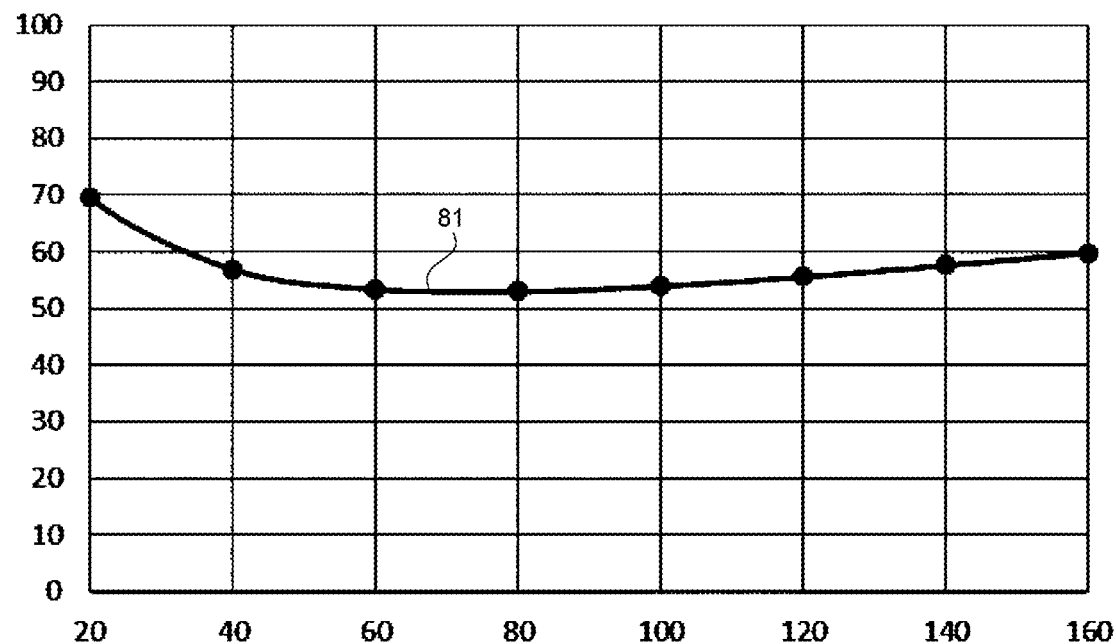

The corresponding dew point margin for the same exemplary isenthalpic curve 81 is shown in FIG. 9 for the same pressure range. In FIG. 8, again an absolute pressure in bar is indicated on the horizontal axis while temperature difference values in K are indicated on the vertical axis.

FIG. 10 illustrates a further steam arrangement according to a particularly preferred embodiment of the invention.

As to the components of the arrangement according to FIG. 10, which is denoted 1600, reference is made to the explanations relating to FIGS. 2 to 6, particularly FIG. 3. Essential aspects of the embodiment shown in FIG. 10 include a two-step combustion air preheating to a temperature level of about 610° C., a feed HC preheating before and after combination with process steam PS in the terminal quench cooling heat exchangers 22 and 23, no boiler feed preheating, use of only three heat exchanger bundles 124, 125 and 126 in the convection section, and a flue gas exhaust temperature of about 110° C.

The invention claimed is:

1. A method of steam cracking, comprising:
   providing a steam cracking arrangement, including:
      one or more fired cracking furnaces;
      one or more quench cooling trains; and
      one or more compressors and/or pumps as rotating equipment, wherein the rotating equipment is at least partly driven by electric energy;
   passing one or more process gas streams at least through the one or more fired cracking furnaces and the one or more quench cooling trains;
   operating one or more steam generation arrangements in thermal association with the one or more steam cracking arrangements;
   wherein:
      operating the one or more steam generation arrangements results in at least superheated high pressure steam at a first pressure level between 30 and 175 bar absolute pressure and at a first temperature level;
      no steam at a higher temperature level than the first temperature level is generated in the one or more steam generation arrangements;
      the superheated high pressure steam at the first pressure level is at least in part adiabatically and isenthalpically expanded to a second pressure level below the first pressure level such that its temperature level is lowered to a second temperature level; and
      the first temperature level is selected such that each intermediate temperature level reached at intermediate pressure levels of more than 20 bar during the adiabatic and isenthalpic expansion is between 5 and 120 K above the dew point of steam at the respective intermediate pressure level during the adiabatic and isenthalpic expansion.

2. The method according to claim 1, wherein the superheated high pressure steam at the first pressure level and at the first temperature level does not include steam generated from process water and/or only includes steam generated from boiler feed water, such that the superheated high pressure steam at the first pressure level and at the first temperature level is provided as high-purity superheated high pressure steam.

3. The method according to claim 2, wherein the one or more process streams, before being passed through the one or more fired cracking furnaces of the one or more steam cracking arrangements, or feed hydrocarbons and/or process steam used in generating the one or more process streams, is or are at least in part heated using heat withdrawn from the one or more process streams downstream of the one or more fired cracking furnaces of the of the one or more steam cracking arrangements.

4. The method according to claim 3, wherein the heat withdrawn from the one or more process streams downstream of the one or more fired cracking furnaces of the of the one or more steam cracking arrangements is at least in part withdrawn from the one or more process streams downstream of the one or more fired cracking furnaces of the of the one or more steam cracking arrangements in one or more direct feed-effluent heat exchangers.

5. The method according to claim 3, wherein the heat withdrawn from the one or more process streams downstream of the one or more fired cracking furnaces of the one or more steam cracking arrangements is at least in part transferred to steam which is thereafter used in heating the one or more process streams, before being passed through the one or more fired cracking furnaces of the one or more steam cracking arrangements, or to feed hydrocarbons and/ or the process steam used in generating the one or more process streams.

6. The method according to claim 5, wherein no steam generated by the one or more steam generation arrangements is expanded in steam turbines delivering shaft powers of more than 1 MW.

7. The method according to claim 1, wherein combustion air used in firing the one or more fired cracking furnaces is preheated to a temperature level of 100 to 1000° C., which is varied during operation.

8. The method according to claim 7, wherein the said combustion air is at least partially preheated in one or more multistream heat exchangers outside the flue gas pathway of the one or more fired cracking furnaces, and at least partially performed by using saturated steam produced in the one or more steam generation arrangements.

9. The method according to claim 8, wherein the said combustion air is at least partially preheated in one or more multistream heat exchangers in the flue gas pathway, wherein, in between two combustion air preheating steps, heat from flue gas is used for other process purposes.

10. The method according to claim 1, wherein the steam cracking arrangement or at least one of the steam cracking arrangements is operated, in different operating modes, using differing total fuel gas consumption rates, while maintaining a constant total cracking product yield.

11. The method according to claim 1, wherein a fuel gas used in firing the one or more fired cracking furnaces is heated to a temperature level which is varied during operation.

12. The method according to claim 11, wherein the fuel gas used in firing the one or more fired cracking furnaces has a hydrogen content between 0 and 100 wt.-%.

13. The method according to claim 12, wherein the fuel gas used in firing the one or more fired cracking furnaces is at least in part be provided by an electrolysis or ammonia decomposition unit.

14. A system for performing a method of steam cracking, the system comprising:
one or more steam cracking arrangements, each steam cracking arrangement including:
one or more fired cracking furnaces;
one or more quench cooling trains; and
one or more compressors and/or pumps as rotating equipment; and
one or more steam generation arrangements operable in thermal association with the one or more steam crack arrangements;
wherein:
the system is configured to pass one or more process gas streams at least through the one or more fired cracking furnaces and the one or more quench cooling trains of the one or more steam cracking arrangements;
the system is configured to drive the rotating equipment at least partly by electric energy;
the one or more steam generation arrangements is or are configured to generate at least superheated high pressure steam at a first pressure level of 30 and 175 bar absolute pressure and at a first temperature level and no steam at a higher temperature level than the first temperature level;
means are provided which are configured to expand the superheated high pressure steam at the first pressure level at least in part adiabatically and isenthalpically to a second pressure level below the first pressure level of at least 20 bar absolute pressure such that its temperature level is lowered to a second temperature level; and
the system is configured to select the first temperature level such that each intermediate temperature level reached at intermediate pressure levels of more than 20 bar during the adiabatic and isenthalpic expansion process is between 5 and 120 K above the dew point of steam at the respective intermediate pressure level during the adiabatic and isenthalpic expansion.

15. The method according to claim 1, wherein the one or more process streams, before being passed through the one or more fired cracking furnaces of the one or more steam cracking arrangements, or feed hydrocarbons and/or process steam used in generating the one or more process streams, is or are at least in part heated using heat withdrawn from the one or more process streams downstream of the one or more fired cracking furnaces of the of the one or more steam cracking arrangements.

16. The method according to claim 1, wherein no steam generated by the one or more steam generation arrangements is expanded in steam turbines delivering shaft powers of more than 1 MW.

17. The method according to claim 7, wherein the said combustion air is at least partially preheated in one or more multistream heat exchangers in the flue gas pathway, wherein, in between two combustion air preheating steps, heat from flue gas is used for other process purposes.

18. The method according to claim 1, wherein the fuel gas used in firing the one or more fired cracking furnaces has a hydrogen content between 0 and 100 wt.-%.

19. The method according to claim 18, wherein the fuel gas used in firing the one or more fired cracking furnaces is at least in part be provided by an electrolysis or ammonia decomposition unit.

* * * * *